(No Model.)
F. G. BUCKPITT.
AIR BRAKE COUPLING.
No. 589,957. Patented Sept. 14, 1897.
Fig. 1.
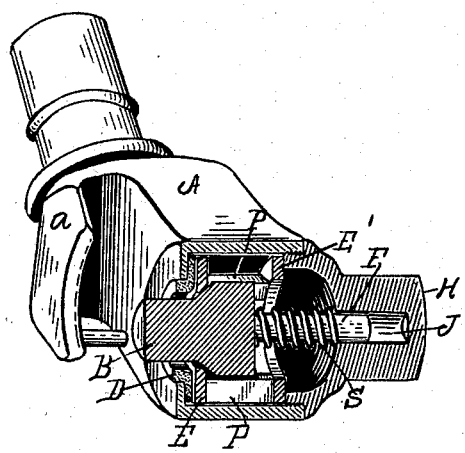
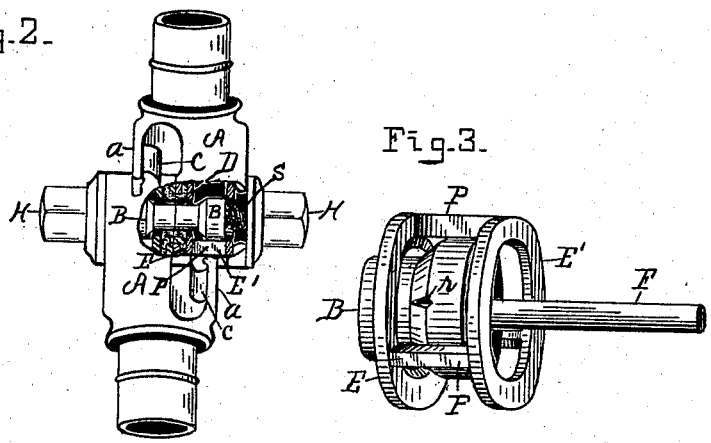
Fig. 2.
Fig. 3.
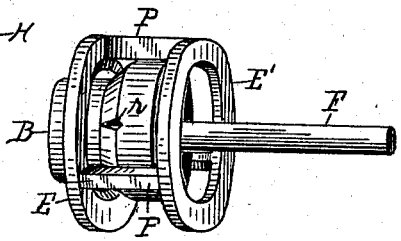
Witnesses:
Ray Hutchins.
Herbert Cowell.
Inventor:
Frederick G. Buckpitt
By Thos. H. Hutchins Attorney.

UNITED STATES PATENT OFFICE.

FREDERICK G. BUCKPITT, OF JOLIET, ILLINOIS.

AIR-BRAKE COUPLING.

SPECIFICATION forming part of Letters Patent No. 589,957, dated September 14, 1897.

Application filed July 29, 1895. Serial No. 557,435. (No model.)

*To all whom it may concern:*

Be it known that I, FREDERICK G. BUCKPITT, a citizen of the United States of America, residing at Joliet, in the county of Will and State of Illinois, have invented certain new and useful Improvements in Air-Brake Couplings, of which the following is a specification, reference being had therein to the accompanying drawings, and the letters of reference thereon, forming a part of this specification, in which—

Figure 1 is a perspective view of one of the coupling-heads, a portion being shown in section to show the parts within the coupling-head. Fig. 2 is a plan view of the two coupling-heads coupled together, a part of each being broken away to show the interior parts; and Fig. 3 is a perspective view of a frame forming a valve-seat and for holding the gasket in its place.

This invention relates to certain improvements in air-brake couplings, which improvements are fully set forth in the following specification and claim.

Referring to the drawings, A A represent the two coupling-heads of the ordinary pattern adapted to be connected with each other through the medium of the lugs *a c* in the ordinary manner, as shown in Fig. 2. As the coupling-heads A A are counterparts of each other, a description of one will suffice for both.

D is a gasket which is held in place by means of the screw-cap H, through the medium of the frame E E' P. Said frame consists of the two flat metal rings E E', connected by means of the parts P, and is introduced between said gasket and screw-cap, so that when said screw-cap is turned down to its place it will cause said frame to bear upon said gasket and hold it in place.

The ring E is wider than ring E' and forms a seat for a valve B, while said valve may pass through the ring E' in order to introduce the valve into said frame. Said valve B has a rearwardly-extending stem F, which extends into a barrel J in said screw-cap H, as shown in Fig. 1, said barrel being deep enough so said valve and its said stem may move back from the valve-seat. A coil-spring on said valve-stem spring presses the said valve forward to its seat and holds it seated when the coupling-heads are uncoupled and disconnected from each other, as shown in Fig. 1, for the purpose of preventing dust and foreign matter from entering the coupling-head when the heads are uncoupled.

The valve B is formed so that its forward part projects through and beyond the gasket D and beyond the face of the coupling-head, as shown in Fig. 1, which figure shows the coupling-head as it would appear uncoupled from its fellow coupling-head and closed by means of the valve B, so no dust, sand, or other objectionable material can enter.

When the two coupling-heads are coupled together, as shown in Fig. 2, the two valves first meet, and as the two parts are coupled together the valves force each other back off their seats against their springs S and thus leave a free passage through the coupling-heads, so air may pass through regardless of the presence of the valves.

When the parts are uncoupled, the springs S will move the valves back to their seats and close the coupling-heads and the pipes that may be connected with them, so that no dust or other objectionable material may enter while the heads are uncoupled from each other.

When the heads are coupled together, the gaskets D meet each other and make an air-tight joint between them. Pressure in the train-pipes holds the brakes from the wheels. In case the train-pipe should be broken or become uncoupled the brakes would be set, and to prevent their being set too suddenly, especially in that part of the train detached from the engine and in the rear of the break in the train-pipe, the seat of the valve B is provided with a notch or groove *r*, through which air may escape gradually after the valve is seated and thus permit the brakes to be set gradually to bring that part of the train to a standstill.

Having thus described my invention, what I claim as new, and desire to secure by Letters Patent, is as follows:

The combination of the coupling-head A having the screw-cap H provided with a barrel J, gasket D, valve B having the rearwardly-extending stem F adapted to enter said barrel, and having its side opposite said stem protrude out beyond said gasket, and having the notch or groove $r$ in its seat for gradually releasing air in the train-pipe to set the brakes, coil-spring S arranged on said stem and the thimble-frame E, E', P for holding said gasket in place and forming a seat for said valve, all arranged to operate substantially as and for the purpose set forth.

FREDERICK G. BUCKPITT.

Witnesses:
THOS. H. HUTCHINS,
RAY HUTCHINS.